United States Patent [19]

Tsai

[11] Patent Number: 5,020,215

[45] Date of Patent: Jun. 4, 1991

[54] METHOD OF AN APPARATUS FOR MANUFACTURING A KEYBOARD

[76] Inventor: Huo-Lu Tsai, 6-6 Fl., No. 10, Chin-Shan Road, Taichung, Taiwan

[21] Appl. No.: 567,384

[22] Filed: Aug. 14, 1990

Related U.S. Application Data

[63] Continuation-in-part of Ser. No. 113,760, Oct. 28, 1987, Pat. No. 4,831,719.

[51] Int. Cl.[5] .................... H01H 11/00; B23P 19/00
[52] U.S. Cl. ............................. 29/622; 29/756; 264/297.2; 264/297.8
[58] Field of Search .................. 29/622, 756; 264/250, 264/294, 297.2, 297.4, 297.8; 425/DIG. 201; 200/5 A

[56] References Cited

U.S. PATENT DOCUMENTS

| | | | |
|---|---|---|---|
| 2,492,973 | 1/1950 | Dofsen et al. | 264/297.8 |
| 3,651,191 | 3/1972 | Glatt et al. | 264/163 |
| 4,720,625 | 1/1988 | Arney et al. | 29/451 |

Primary Examiner—P. W. Echols
Attorney, Agent, or Firm—Merchant, Gould, Smith, Edell, Welter & Schmidt

[57] ABSTRACT

A method for producing keyboards primarily includes the following steps: molding character keys of the keyboard in a first injection mold having cavities which coincide with character keys of a commercial keyboard; removing the character keys from the first injection mold; socketting the character keys on corresponding switches of the keyboard; molding function keys of the keyboard in a second injection mold; removing the function keys from the second injection mold and placing the function keys on a function key collecting board, the function keys being classified into individual groups corresponding to the arrangement of the function keys on the keyboard; removing the individual groups of function keys from the function key collecting board; socketting the individual groups of function keys on the corresponding switches of the keyboard; and pressing the socketted character keys and the function keys onto the corresponding switches.

5 Claims, 7 Drawing Sheets

METHOD OF AN APPARATUS FOR MANUFACTURING A KEYBOARD

BACKGROUND OF THE INVENTION

This is a continuation in part of Ser. No. 113,760 filed Oct. 28, 1987 now of U.S. Pat. No. 4,831,719.

The present invention relates to a method for producing keyboards, more particularly to a method for automatically producing keyboards wherein the character keys and the function keys of the keyboard are fabricated in separate molds.

U.S. Pat. No. 4,831,719 discloses a method for automatically manufacturing keyboards which method comprises the following steps: (1) molding keys in an injection mold in which the arrangement of cavities thereof coincide with those of a commercial keyboard; (2) removing the keys from the injection mold; (3) socketting the molded keys on corresponding switches of the keyboard; and (4) pressing the socketted keys onto the corresponding switches. The above disclosed method drastically reduces manpower requirement while making production much faster and more efficient.

Although the above disclosed method may offer many advantages over traditional keyboard manufacturing methods, it has several shortcomings:

1. If the keyboard to be manufactured is of a relatively large size, the size of the mold is correspondingly bigger in order to permit the mold's cavities to coincide with those of the keyboard. This need arises since all the keys are fabricated in a single molding process. A larger mold would cause some inconvenience because of the extra space required.

2. The location and the arrangement of the keys on the keyboard, particularly those of the function keys, may vary according to the manufacturer's specifications. The mold of the above method, however, may be used to fabricate only a single distinct arrangement of keys. Another mold would have to be used to accommodate even a slight alteration in the position of the function keys.

3. When using the above method, the color of the function keys is similar to that of the ordinary character keys. This is inconsistent with the common practice of fabricating the function keys in a color different from that of the character keys.

SUMMARY OF THE INVENTION

Therefore, the objective of the present invention is to provide an improved method of manufacturing keyboards which utilizes a multi-stage molding process to reduce the size of the molds used.

Another object of the present invention is to provide a method of manufacturing keyboards which allows the production of keyboards having different key arrangements without the need to change the molds used.

Still another object of the present invention is to provide a method of manufacturing keyboards which allow the fabrication of character and function keys in more than one color.

A further object of the present invention is to provide an apparatus to carry out the manufacturing method of the preferred embodiment.

Accordingly, the method for automatically producing keyboards comprises the following steps: (1) molding character keys of the keyboard in a first injection mold having cavities which coincide with character keys of a commercial keyboard; (2) removing the character keys from the first injection mold; (3) socketting the character keys on the corresponding switches of the keyboard; (4) molding function keys of the keyboard in a second injection mold; (5) removing the function keys from the second injection mold and placing the function keys on a function key collecting board, the function keys being classified into individual groups corresponding to the arrangement of the function keys on the keyboard; (6) moving the individual groups of function keys from the function key collecting board; (7) socketting the individual groups of function keys on the corresponding switches of the keyboard; and (8) pressing the socketted character and function keys onto their corresponding switches. The first and second injection molds used to fabricate the character and function keys are two-color injection molds. This allows the colors of the character keys and the function keys to be different from each other.

BRIEF DESCRIPTION OF THE DRAWINGS

Other features and advantages of this invention will become apparent in the following detailed description of the preferred embodiment with reference to the accompanying drawings, in which.

DETAILED DESCRIPTION OF THE PREFERRED EMBODIMENT

Figure 1:
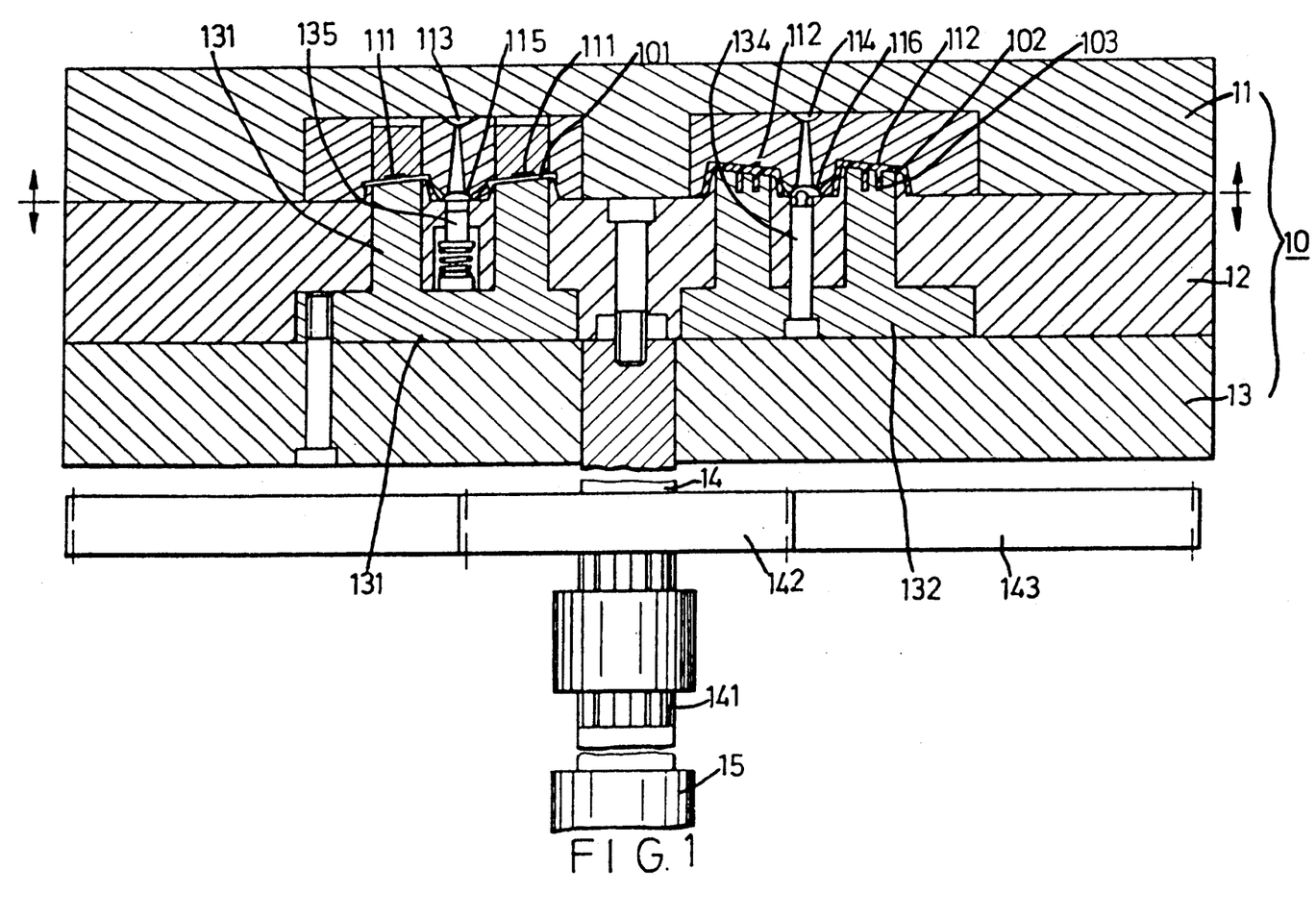
FIG. 1 is a sectional view of the mold assembly of an apparatus used in the method of the present invention.

FIG. 1 is a sectional view of a key molding assembly 10 of an apparatus 300 (shown in FIG. 4) which is adapted to perform a two-color injection molding process. The mold assembly 10 includes a stationary upper-half mold 11, a movable and rotatable lower-half mold 12, and a movable support plate 13 fastened to the bottom of the lower-half mold 12. The lower-half mold 12 is mounted to the upper end of an axle 14 which is driven by an air compression cylinder 15. The lower-half mold 12 and the supporting plate 13 are reciprocally moved by the air compression cylinder 15 in an up and down direction relative to the upper-half mold 11 so as to effect closing and opening of the mold assembly 10. The axle 14 has grooves 141 to engage the teeth of a transmission gear 142. The transmission gear 142, in turn, engages a driving gear 143. The driving gear 143 is provided to drive the lower-half mold 12 in a 180-degree rotation.

The left side of the upper-half mold 11 is provided with a number of key cavities 111 used for the first colored injection, usually to mold face members formed with different characters. The right side of the upper-half mold 11 is similarly provided with a number of key cavities 112 used for the second colored injection, usually to mold key housings integrated with the face members, thus forming a number of complete keys. A plurality of sprues 113 and runners 115 are provided to intercommunicate the cavities 111. A plurality of sprues 114 and runners 116 are similarly provided to intercommunicate the cavities 112.

The lower-half mold 12 has a plurality of through ways which receive protrusions 131 and 132, which extend from and are fastened to the supporting plate 13. The protrusions 131 and 132 extend into the cavities 111 and 112, respectively, to confine mold chambers when the mold assembly 10 is closed.

Figure 2:
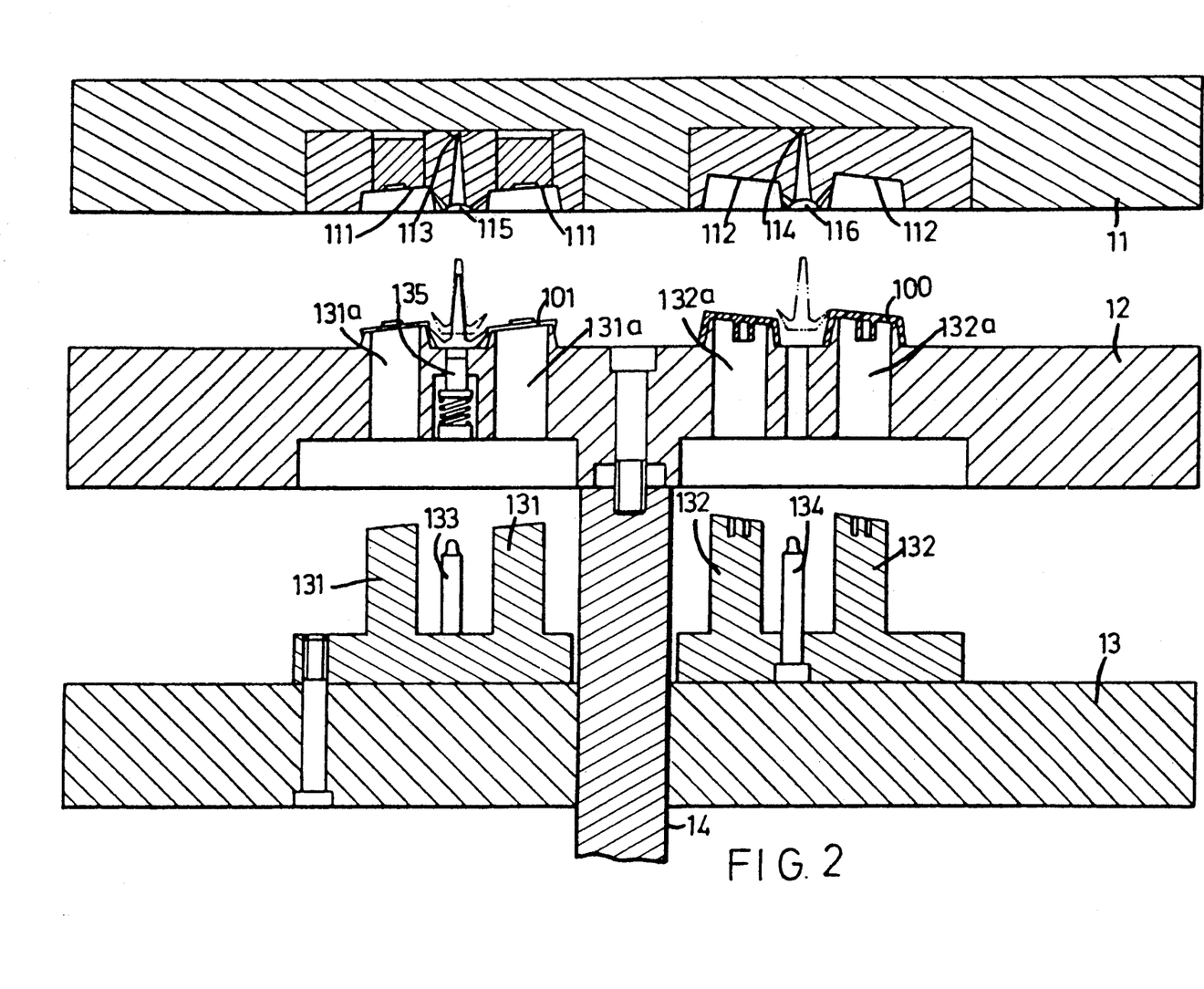
FIG. 2 is a sectional view of the mold assembly when in an open position after accomplishing the first injection step of a two-color injection molding.
Figure 3:
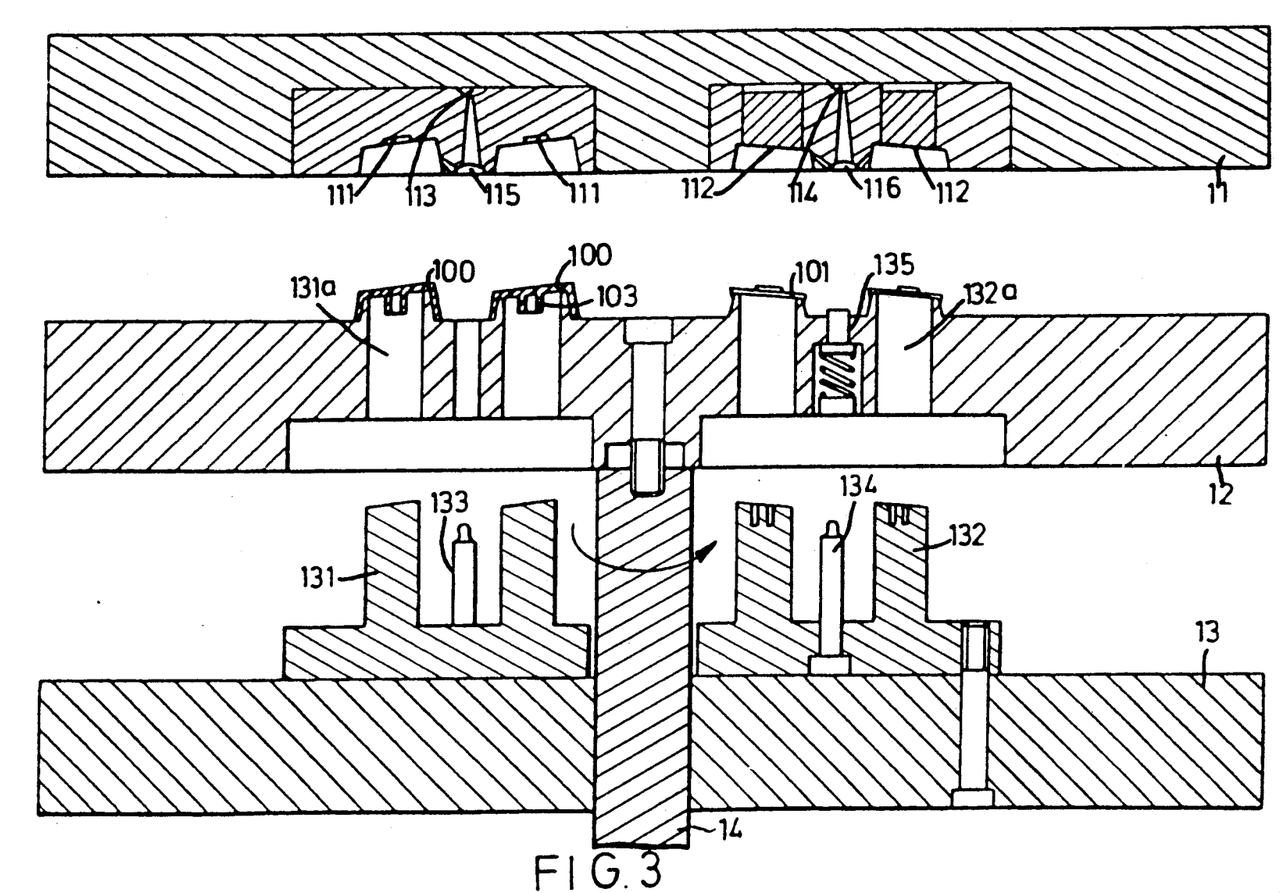
FIG. 3 is a sectional view of the mold assembly when in an open position after accomplishing the second injection step of the two-color injection molding.

Referring to FIGS. 2 and 3, a plurality of protruding pins 131 and 132 are respectively provided between pairs of adjacent protrusions 131 and 132. The protruding pins 133 and 134 project into the runners 115 and 116 so that when the mold assembly 10 is opened, residual injection scrap in the runners 115 and 16 will be drawn out of the sprues 113 and 114 by the protruding pins 133 and 134. The lower-half mold 12 is further provided with a number of resilient devices 135 located between each pair of adjacent through ways 131a and 132b. The resilient devices 135 are depressed and kept in the lower-half mold 12 by the upper-half mold 11 when the mold assembly 10 is closed. Once the mold assembly 10 is opened, the resilient devices 135 expand, thus removing the residual injection scrap attached to the molded bodies 100 and 101.

After the first colored injection to form the face members 101 has been accomplished, as shown in FIG. 2, the mold assembly 10 is opened and the lower-half mold 12 and the supporting plate 13 are rotated 180-degrees by the driving gear 143, so that the second colored injection may be performed to produce the molded keys 100.

Figure 4:
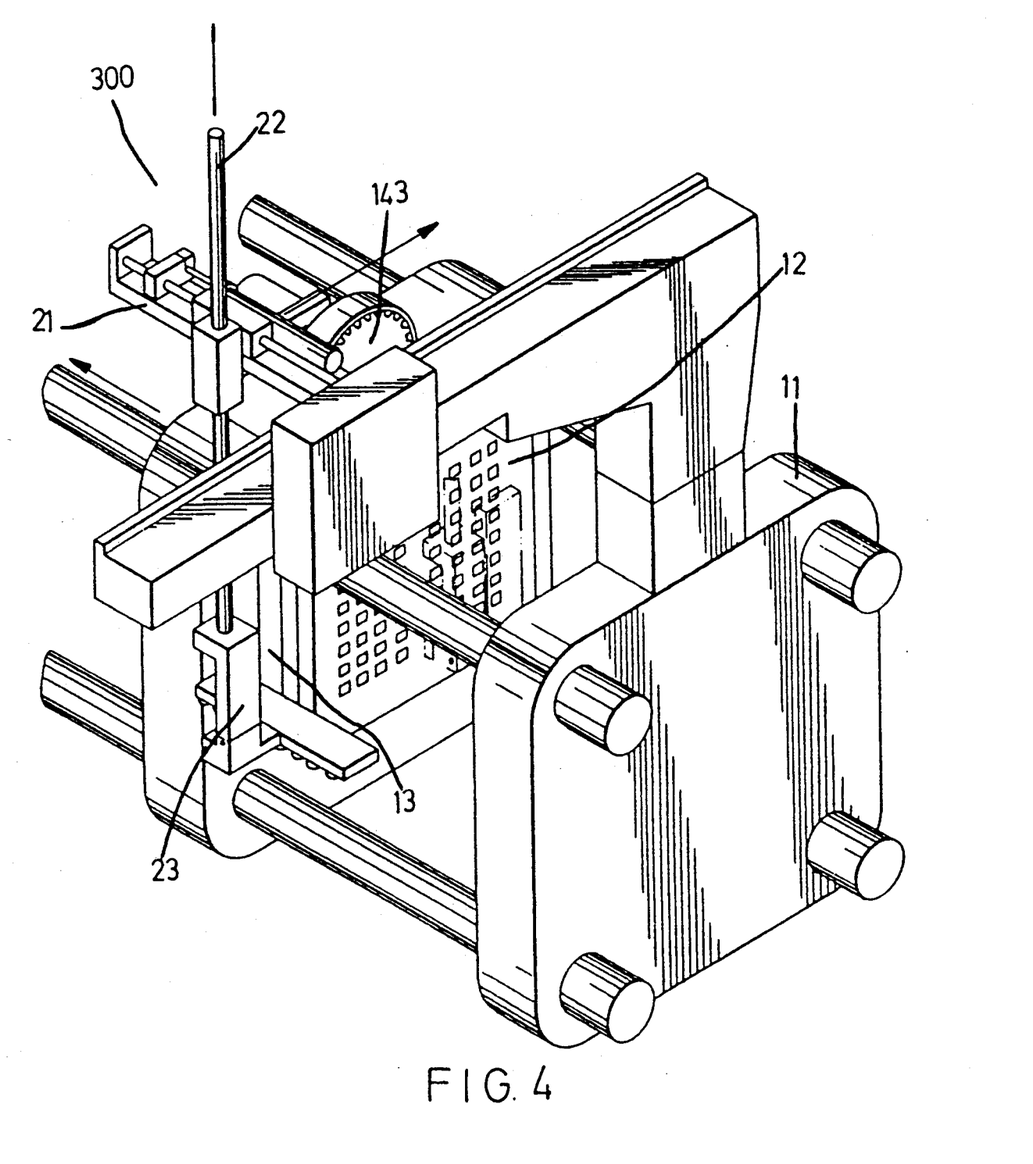
FIG. 4 is a perspective view of the apparatus shown in FIG. 1.
Figure 5:
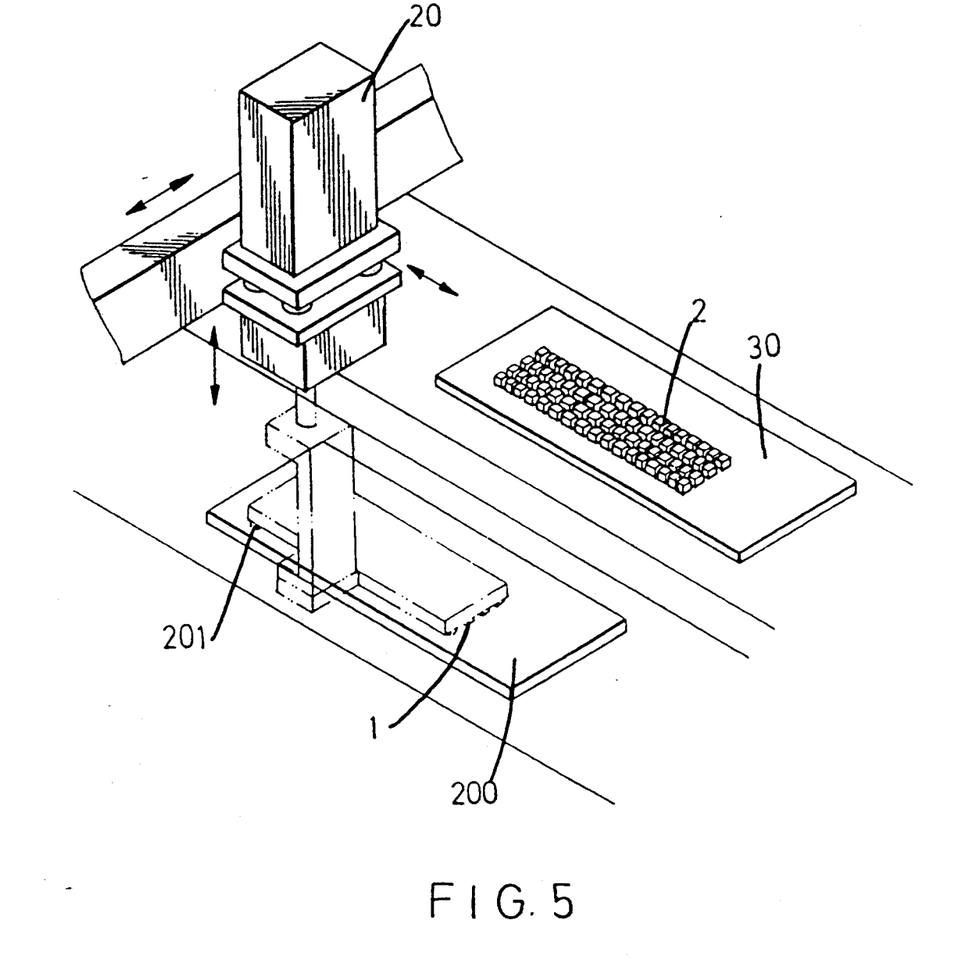
FIG. 5 is a plan view illustrating the step of socketting the character keys on the keyboard switches.

Referring once more to FIG. 3, the lower-half mold 12 is rotated to move the molded keys 100 from the right to the left after the mold assembly 10 is opened. When the lower-half mold 12 is lowered towards the supporting plate 13, the molded keys 100 are pushed away from the lower-half mold 12 by the protrusions 131. A removal device 20, as shown in FIG. 4, is then moved to a position above the lower-half mold 12. The removal device 20 includes a bracket 21 and a movable arm 22. The movable arm 22 is pivoted with a wrist portion 23 which is rotated at a 90-degree angle. A plurality of suction cups (not shown) are provided on the wrist portion 23 to grasp the molded keys 100. Upon completion of the two-color injection process, the different molded keys 100 are socketted in the corresponding switches 201 of a board 200 by the removal device 20. This procedure is best shown in FIG. 5. The board 200 is properly positioned on the apparatus 300 at a location near the mold assembly 10 so that the molded keys 100, which are held by the force of suction exerted by the removal device 20, can be easily moved onto the board 200 for socketting on the switches 201.

Figure 8:
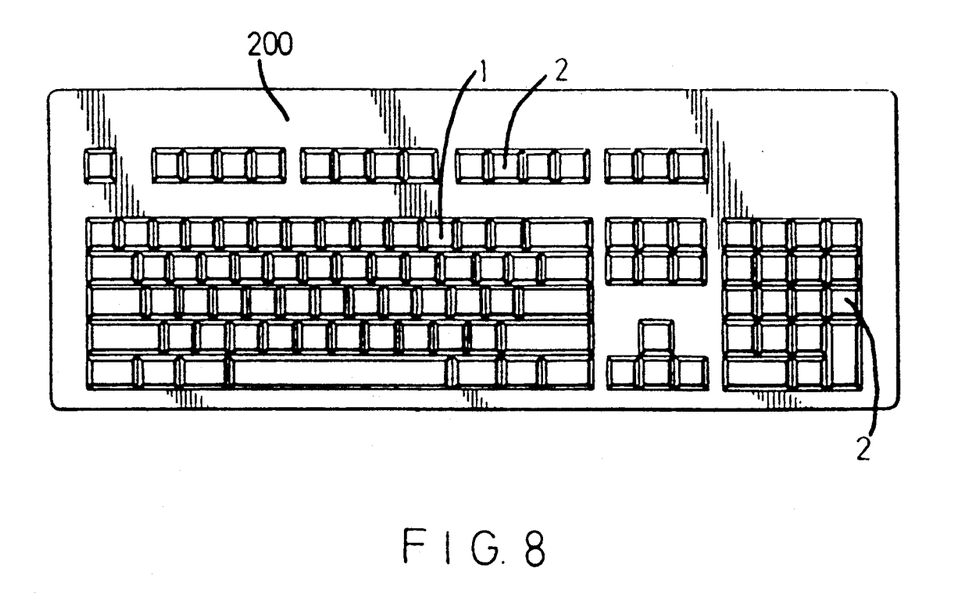
FIG. 8 is a top view of a completed keyboard manufactured using the method and the apparatus of the present invention.

Referring to FIG. 8, the keys 100 of the keyboard to be manufactured by the method according to the present invention are divided into two groups, the ordinary character keys 1 and the function keys 2, which are positioned at different locations on the board 200. When molding of the character keys 1 has been accomplished, the character keys 1 are moved and socketted on the corresponding switches 201 of the board 200, as shown in FIG. 5. The arrangement of the suction cups for removing and socketting the character keys 1 is similar to the arranged order of the corresponding switches 201 of the board 200. Thus, the arrangement of the cavities 111 and 112 in the mold assembly for the character keys 1 should similarly correspond to the arrangement of the switches 201 on the board 200.

Simultaneous with the injection molding and assembling of the character keys 1 on the board 200, a second two-color injection process is performed on a second mold assembly, similar to the mold assembly 10, to produce the function keys 2. The colors black and white may be used in fabricating the character keys 1, while the colors black and gray may be used to produce the function keys 2. This permits ease of distinguishing the character keys 1 from the function keys 2.

Figure 6A:
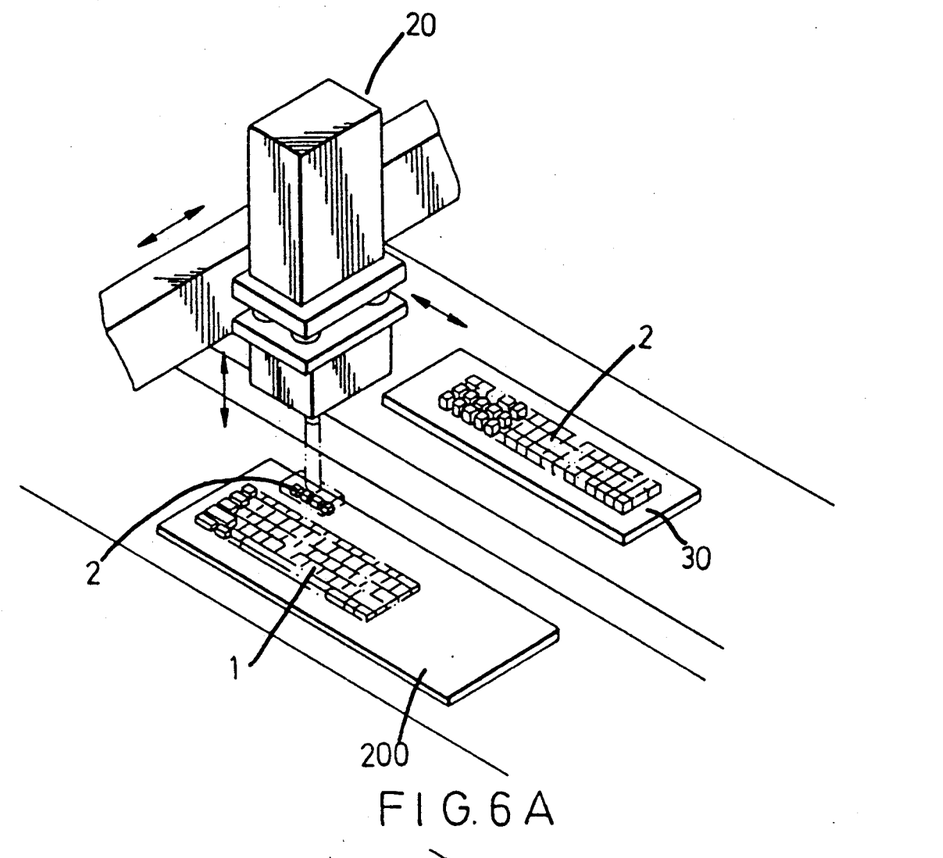
FIGS. 6A and 6B are plan views illustrating the step of socketting the function keys on the keyboard switches.
Figure 6B:
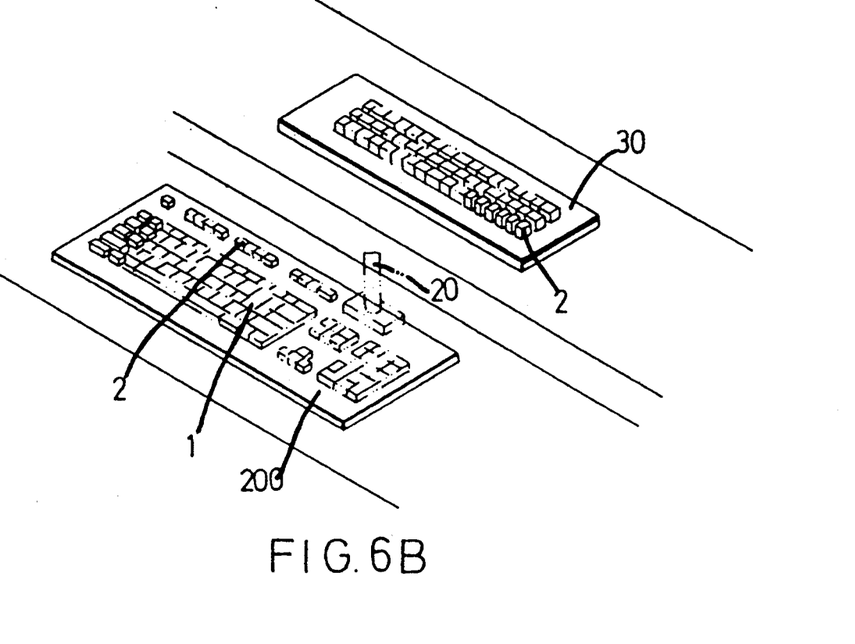

Referring to FIGS. 6A and 6B, after the second coloring injection to produce the function keys 2 has been accomplished, the molded function keys 2 are moved by the removal device 20 from the second mold assembly and placed on a function key collecting board 30. The function keys 2 on the function key collecting board 30 are classified into individual groups according to their arrangement on the keyboard to be manufactured. The removal device 20 is controlled by a computer such that, after the character keys 1 have been assembled on the board 200, the removal device 20 moves the individual groups of function keys 2 from the function key collecting board 30 so that they may be properly socketted on the corresponding switches 201 of the board 200.

Figure 7:
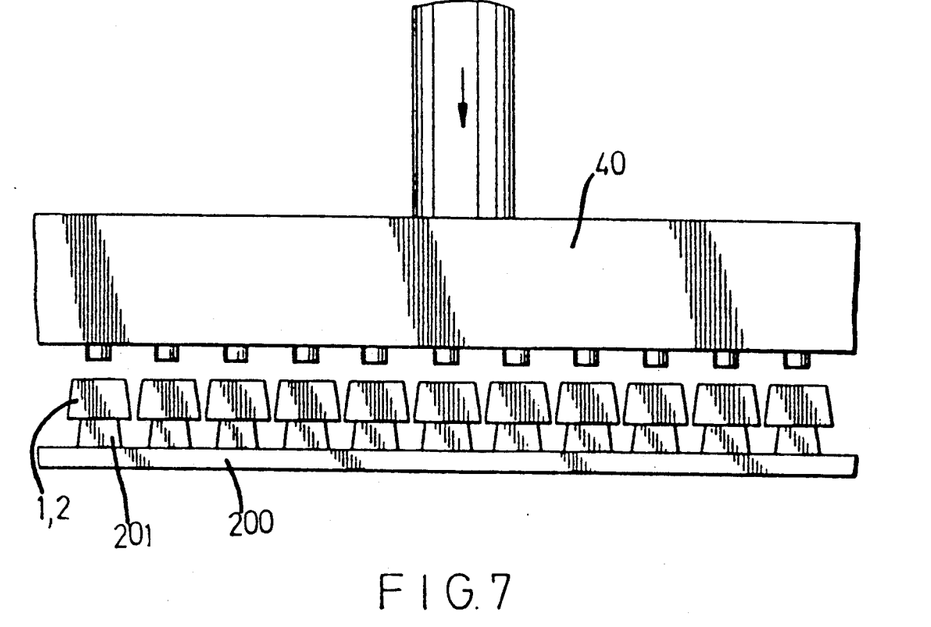
FIG. 7 is a schematic view illustrating the pressing step of the present invention.

Finally, a pressing device 40 (shown in FIG. 7) is used to press the socketted molded keys 1 and 2 against the board 200 so as to tightly engage them with the switches 201, forming the complete keyboard illustrated in FIG. 8.

One of the advantages of the method of the present invention is that the size of the molds used is relatively small since the number of cavities in each half mold of the mold assembly only corresponds to a part of the total number of keys of the completed keyboard. Furthermore, it is not necessary to arrange the cavities in the half mold for the function keys according to the location of the corresponding switches on the board nor to the distance between adjacent groups of switches. This means that the half mold can be adapted to manufacture a wide variety of keyboards having distinct key arrangements. Still another advantage which results from the use of the method according to the present invention is that the function keys can be molded of a different color than that of the character keys. This provides aesthetic appeal and facilitates distinguishing of the different groups of keys.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A method of manufacturing a keyboard having character keys, function keys, and switches to be correspondingly socketted with said character and said function keys, said manufacturing method comprising:

molding said character keys in a first injection mold having cavities which coincide with character keys of a commercial keyboard;

removing said character keys from said first injection mold;

socketting said character keys on said corresponding switches of said keyboard;

molding said function keys in a second injection mold;

removing said function keys from said second injection mold and placing said function keys on a function key collecting board, said function keys being classified into individual groups corresponding to the arrangement of said function keys on said keyboard;

removing said individual groups of said function keys from said function key collecting board;

socketting said individual groups of said function keys on said corresponding switches of said keyboard; and     pressing said socketted character keys and said function keys onto said corresponding switches.

2. An apparatus for manufacturing a keyboard having character keys, function keys, and switches to be correspondingly socketted with said character and said function keys, said apparatus comprising:

a first injection mold for molding said character keys, said first injection mold having cavities which coincide with character keys of a commercial keyboard;

a second injection mold for molding said function keys;

a function key collecting board;

means for removing said character keys from said first injection mold and socketting said character keys on said corresponding switches of said keyboard, said removing and socketting means similarly removing said function keys from said second injection mold and placing said function keys on said function key collecting board, said function keys on said function key collecting board being classified into individual groups corresponding to the arrangement of said function keys on said keyboard, said removing and socketting means also removing said individual groups of said function keys from said function key collecting board and socketting said individual groups of function keys on said corresponding switches of said keyboard;

means for classifying said function keys into said individual groups and for controlling said removing and socketting means to effect movement of said individual groups of said function keys from said function key collecting board and socketting of said individual groups of said function keys on said corresponding switches of said keyboard; and     means for pressing said socketted character and said function keys onto said corresponding switches.

3. The apparatus as claimed in claim 2, wherein said classifying and controlling means is a computer.

4. The apparatus as claimed in claim 3, wherein said removing and socketting means comprises a suction device to grasp said character and said function keys.

5. The apparatus as claimed in claim 2, wherein said first and said second injection molds are two-color injection molds, said character keys and said function keys being molded to have colors different from each other.

* * * * *

UNITED STATES PATENT AND TRADEMARK OFFICE
CERTIFICATE OF CORRECTION

PATENT NO. : 5,020,215
DATED : June 4, 1991
INVENTOR(S) : Tsai

It is certified that error appears in the above-identified patent and that said Letters Patent is hereby corrected as shown below:

ON THE TITLE PAGE:

In the title, "AN" should read --AND--.

In Column 3, line 24, "16" should read --116--.

Signed and Sealed this

Tenth Day of November, 1992

Attest:

DOUGLAS B. COMER

*Attesting Officer*      *Acting Commissioner of Patents and Trademarks*